United States Patent [19]
Yoon

[11] Patent Number: 6,160,592
[45] Date of Patent: Dec. 12, 2000

[54] CONTROL DEVICE FOR UNIFYING THE BRIGHTNESS OF A DISPLAY SCREEN AND METHOD THEREOF

[75] Inventor: Kyung-Choon Yoon, Suwon, Rep. of Korea

[73] Assignee: Samsung Electronics, Co., Ltd., Suwon, Rep. of Korea

[21] Appl. No.: 09/225,518

[22] Filed: Jan. 6, 1999

[30] Foreign Application Priority Data

Jan. 6, 1998 [KR] Rep. of Korea ............................ 98-112
Jan. 6, 1998 [KR] Rep. of Korea ............................ 98-113
Mar. 20, 1998 [KR] Rep. of Korea ........................ 98-9619

[51] Int. Cl.$^7$ ..................................................... H04N 5/68
[52] U.S. Cl. ........................................... 348/687; 348/806
[58] Field of Search ..................................... 348/687, 704, 348/180, 189, 806; 315/364, 379, 399

[56] References Cited

U.S. PATENT DOCUMENTS

5,596,375 1/1997 Kwon ....................................... 348/687
5,699,127 12/1997 Ando et al. .............................. 348/687

*Primary Examiner*—Victor R. Kostak
*Attorney, Agent, or Firm*—Staas & Halsey LLP

[57] ABSTRACT

A brightness adjustment device for a display device including a microprocessor for outputting a brightness control signal according to a synchronizing signal provided from a display signal source; a parabolic wave generator for generating a parabolic wave according to the brightness control signal supplied from said microprocessor; a video pre-amplifier for summing a video signal provided from the display signal source and the parabolic wave supplied from the parabolic generator and amplifying the summed signal; and a video main amplifier for amplifying the video signal supplied from the video pre-amplifier and outputting the amplified video signal to a cathode ray tube. A method of brightness adjustment for the display device using the brightness adjustment device includes the steps of: receiving a synchronizing signal from a display signal source at the microprocessor; receiving a video signal from the display signal source at the video pre-amplifier; recognizing a frequency of the received synchronizing signal; generating and outputting a brightness control signal according to the discriminated frequency; generating and outputting a parabolic wave according to the brightness control signal; summing the parabolic wave and the video signal; amplifying the summed signal; and outputting the amplified signal to the cathode ray tube.

28 Claims, 8 Drawing Sheets

CONTROL DEVICE FOR UNIFYING THE BRIGHTNESS OF A DISPLAY SCREEN AND METHOD THEREOF

CLAIM OF PRIORITY

This application makes reference to, incorporates the same herein, and claims all benefits accruing under 35 U.S.C. §119 from my applications entitled *Contrast Deviation Compensating Device of Display Apparatus, Contrast Deviation Compensating Device of Display Apparatus* and *Display Apparatus of Revision Device to Brightness Deflection* filed in the Korean Industrial Property Office on Jan. 6, 1998, Jan. 6, 1998 and Mar. 20, 1998.

BACKGROUND OF THE INVENTION

1. Field of the Invention

The present invention relates to a display device, especially a brightness control device can unify the brightness of the display device that and a method thereof.

2. Description of the Related Art

Structurally, a size of a fluorescent substance at the corner of a cathode ray tube is smaller than a size of a fluorescent substance at the center portion of the cathode ray tube. A thickness for the corner is thicker than a thickness of the center portion of the cathode ray tube. The ratio of a transmitted light of the corner of the cathode ray tube is lower than the center portion of the cathode ray tube. Thus, the corner portion of the cathode ray tube is darker than the center portion of the cathode ray tube. The declination of the brightness between the center and the corner is between 20%~30%.

SUMMARY OF THE INVENTION

Accordingly, in order to overcome such drawbacks in the conventional art, it is therefore an object of the present invention to unify the brightness of a display screen.

It is another object of the present invention to reduce the declination of the brightness between the center portion and the corner portion.

Additional objects and advantages of the invention will be set forth in part in the description which follows and, in part, will be obvious from the description, or may be learned by practice of the invention.

To achieve these objects and other advantages and in accordance with the purpose of the present invention, as embodied and broadly described, there is provided a brightness adjustment device for a display device comprising: a microprocessor for outputting a brightness control signal according to a synchronizing signal provided from a display signal source; a parabolic wave generator for generating a parabolic wave according to the brightness control signal supplied from the microprocessor; a video pre-amplifier for summing a video signal provided from the display signal source and the parabolic wave supplied from the parabolic generator, and amplifying the summed signal; and a video main amplifier for amplifying the video signal supplied from the video pre-amplifier and outputting the amplified video signal to a cathode ray tube.

According to another aspect of the present invention, there is also provided a brightness adjustment device for a display device comprising: a microprocessor for outputting a brightness control signal according to a synchronizing signal provided from a display signal source; a parabolic wave generator for generating a parabolic wave according to the brightness control signal supplied from the microprocessor; a sawtooth wave generator for generating a sawtooth wave according to the brightness control signal provided from the microprocessor; a video pre-amplifier for summing a video signal provided from the display signal source, the parabolic wave supplied from the parabolic generator and the sawtooth wave provided from the sawtooth wave generator, and amplifying the summed signal; and a video main amplifier for amplifying the video signal supplied from the video pre-amplifier and outputting the amplified video signal to a cathode ray tube.

According to still another aspect of the present invention, there is also provided a brightness adjustment device for a display device comprising: a microprocessor for outputting a brightness control signal according to a synchronizing signal provided from a display signal source; a parabolic wave generator for generating a parabolic wave according to the brightness control signal supplied from the microprocessor; a delay signal generator for generating a delay signal according to the brightness control signal provided from the microprocessor; a video pre-amplifier for summing a video signal provided from the display signal source, the parabolic wave supplied from the parabolic generator, and the delay signal generated, by the delay signal generator and amplifying the summed signal; and a video main amplifier for amplifying the video signal supplied from the video pre-amplifier and outputting the amplified video signal to a cathode ray tube.

According to still yet another aspect of the present invention, there is also provided a method of brightness adjustment for a display device comprising the steps of: receiving a synchronizing signal from a display signal source at a microprocessor; receiving a video signal from the display signal source at a video pre-amplifier; recognizing a frequency of the received synchronizing signal; generating and outputting a brightness control signal according to the discriminated frequency; generating and outputting a parabolic wave according to the brightness control signal; summing the parabolic wave and the video signal; amplifying the summed signal; and outputting the amplified signal to a cathode ray tube.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DESCRIPTION OF THE PREFERRED EMBODIMENTS

Figures 1, 2A, 2B:
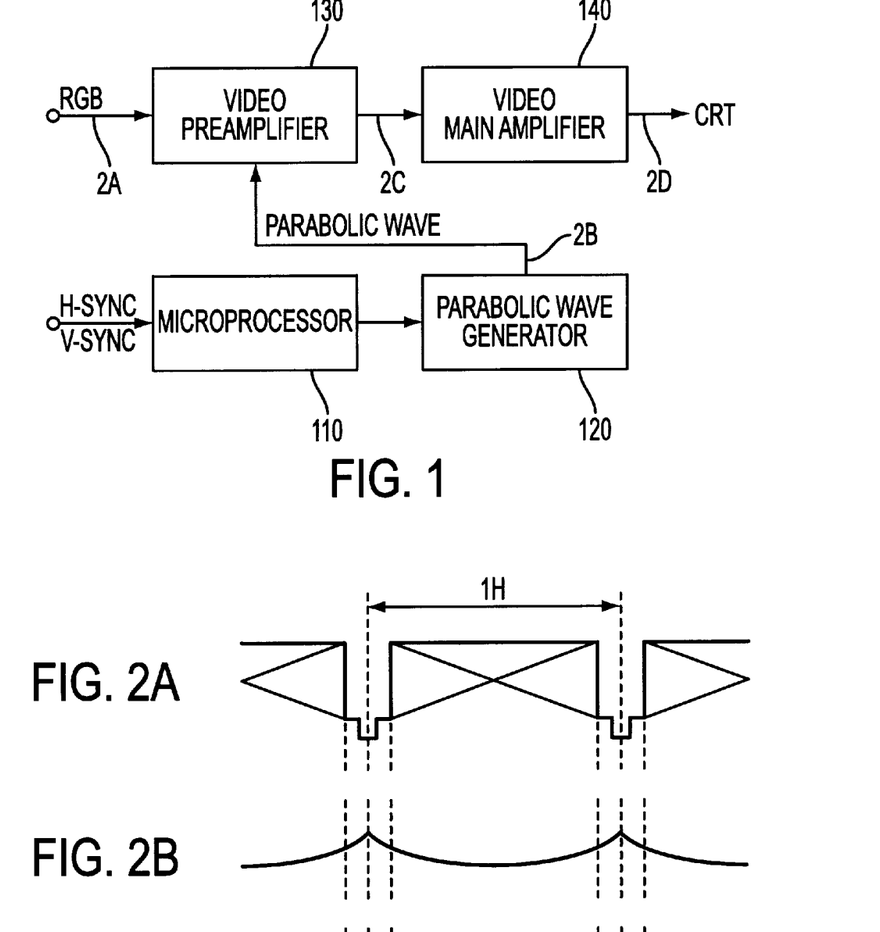
FIG. 1 is a block diagram of a brightness control device according to a first embodiment of the present invention.
FIGS. 2A–2D show waveforms of various signals present at respective points of the brightness control device shown in FIG. 1.

FIG. 1 is a block diagram showing a brightness control device according to a first embodiment of the present invention. Referring to FIG. 1, a microprocessor 110 receives a synchronization signal (both H-SYNC and V-SYNC signals) from a display signal source (not shown) and recognizes the frequency of the synchronization signal. A video signal (RGB signal) generated from the display signal source is supplied to a video preamplifier 130. The microprocessor 110 generates a brightness control signal according to the recognized frequency, a parabolic wave generator 120 generates a parabolic wave according to the brightness control signal supplied from the microprocessor 110. The parabolic wave generated from the parabolic wave generator 120 is transmitted to the video preamplifier 130. The video signal and the parabolic wave are summed in a contrast controller (not shown) established in the video preamplifier 130. The video preamplifier 130 amplifies the summed signal and outputs the amplified signal to a video main amplifier 140. The amplified video signal transferred from the video preamplifier 130 is inverted and amplified by the video main amplifier 140 and then output to a CRT.

Figure 2C:
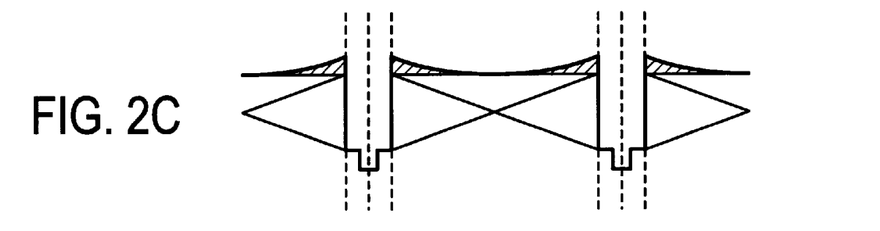
Figure 2D:
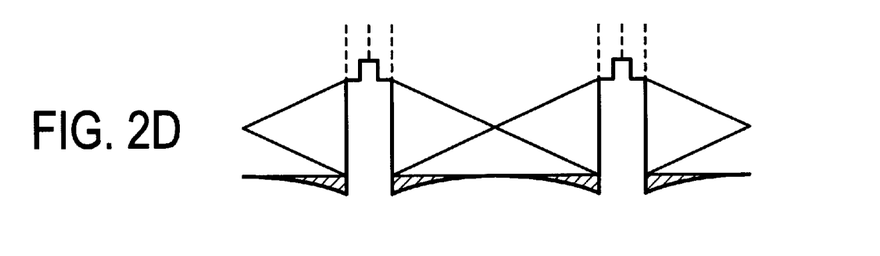

FIGS. 2A–2D show waveforms of various signals present at respective points of the brightness control device shown in FIG. 1. FIG. 2A shows the video signal supplied from the display signal source to the video preamplifier 130. FIG. 2B shows the parabolic wave generated by the parabolic wave generator 120. FIG. 2C shows the video signal output from the video preamplifier 130 after summing and amplifying the video signal and the parabolic wave. FIG. 2D shows the video signal amplified by the video main amplifier 140.

Figure 3:
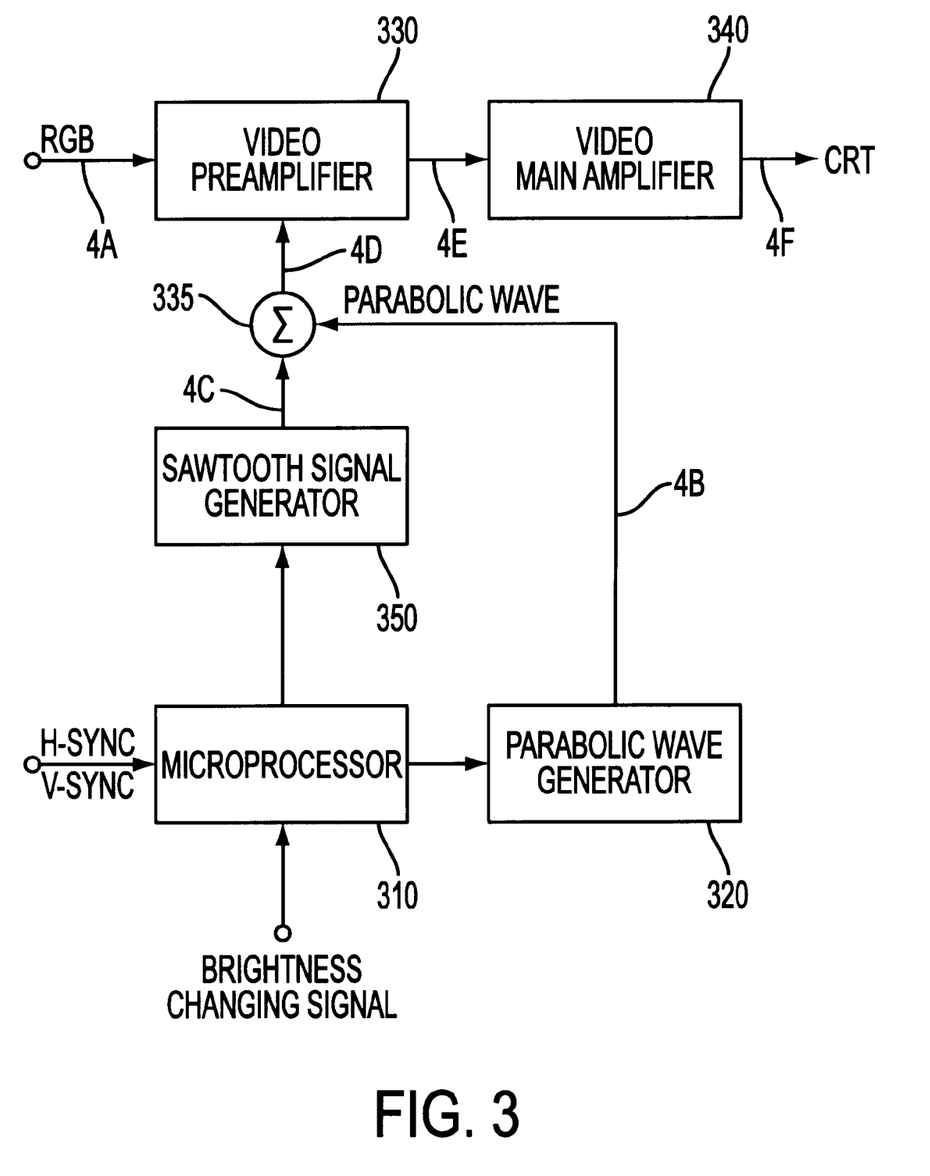
FIG. 3 is a block diagram of a brightness control device according to a second embodiment of the present invention.

FIG. 3 is a block diagram showing a brightness control device according to a second embodiment of the present invention. Referring to FIG. 3, a microprocessor 310 receives a synchronization signal (both the H-SYNC and V-SYNC signals) from a display signal source (not shown) and a brightness changing signal from a control panel (not shown). The microprocessor 310 recognizes the frequency of the input synchronization signal and outputs a brightness control signal according to the recognized frequency and the brightness changing signal. The brightness control signal output from the microprocessor 310 is applied to a parabolic wave generator 320 and a sawtooth signal generator 350. The parabolic wave generator 320 generates a parabolic wave according to the brightness control signal supplied from the microprocessor 310. The sawtooth signal generator 350 generates a sawtooth signal according to the brightness control signal supplied from the microprocessor 310. A video signal (RGB signal) generated from the display signal source is supplied to a video preamplifier 330. The parabolic wave and the sawtooth signal are transmitted to a summer 335, which outputs a first summed signal. The video signal and the summed signal are summed in a contrast controller (not shown) established in the video preamplifier 330, to generate a second summed signal. The video preamplifier 330 amplifies the second summed signal and outputs the amplified signal to a video main amplifier 340. The amplified video signal transferred from the video preamplifier 330 is inverted and amplified by the video main amplifier 340.

Figure 4A:
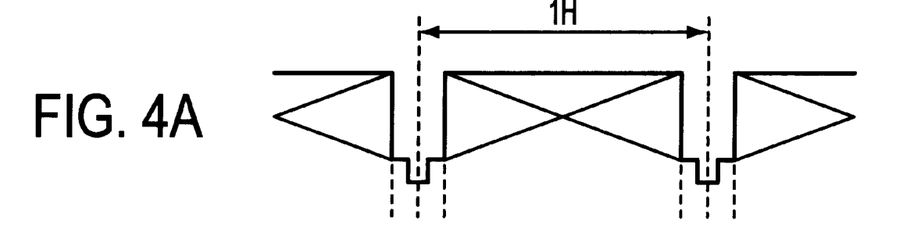
FIGS. 4A–4F show waveforms of various signals present at respective points of the brightness control device shown in FIG. 3.
Figure 4B:
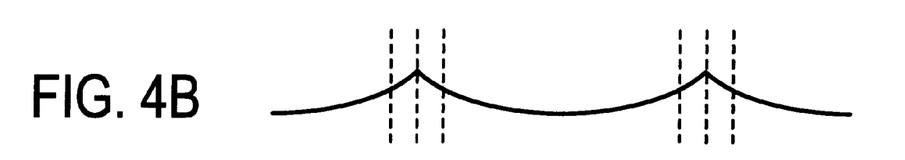
Figure 4C:
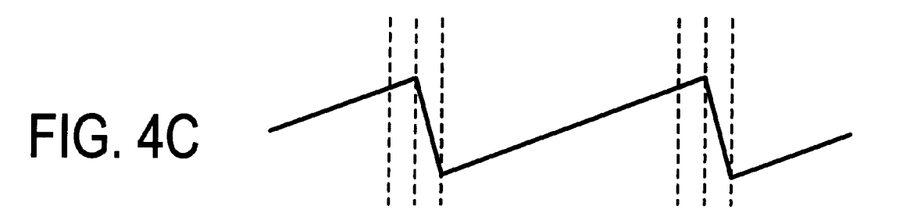
Figure 4D:
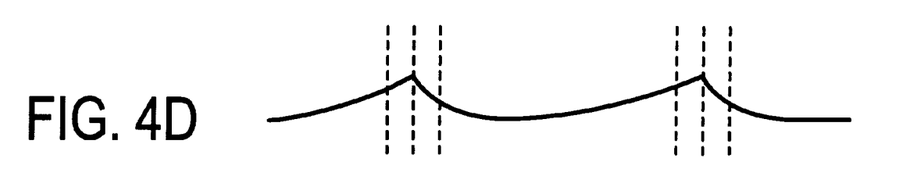
Figure 4E:
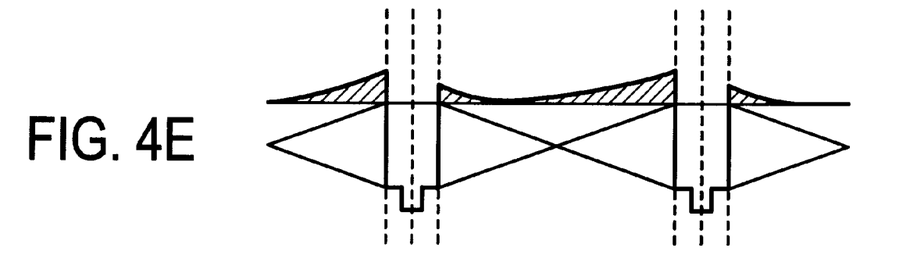
Figure 4F:
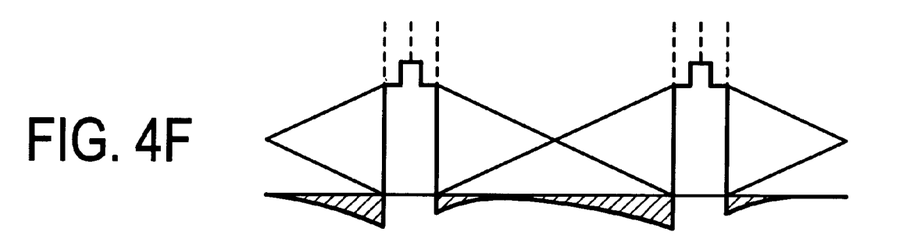

FIGS. 4A–4F show waveforms of various signals present at respective points of the brightness control circuit shown in FIG. 3. FIG. 4A shows the video signal supplied from the display signal source to the video preamplifier 330. FIG. 4B shows the parabolic wave generated by the parabolic wave generator 320. FIG. 4C shows the sawtooth signal generated by the sawtooth signal generator 350. FIG. 4D shows the first summed signal after summing the parabolic signal from the parabolic wave generator 320 and the sawtooth signal from the sawtooth signal generator 350 by the summer 335. FIG. 4E shows the video signal (second summed signal) output from the video preamplifier 330 after summing the video signal and the first summed signal (the sum of the parabolic wave and the sawtooth signal). FIG. 4F shows the video signal amplified and inverted by the video main amplifier 340.

Figure 5:
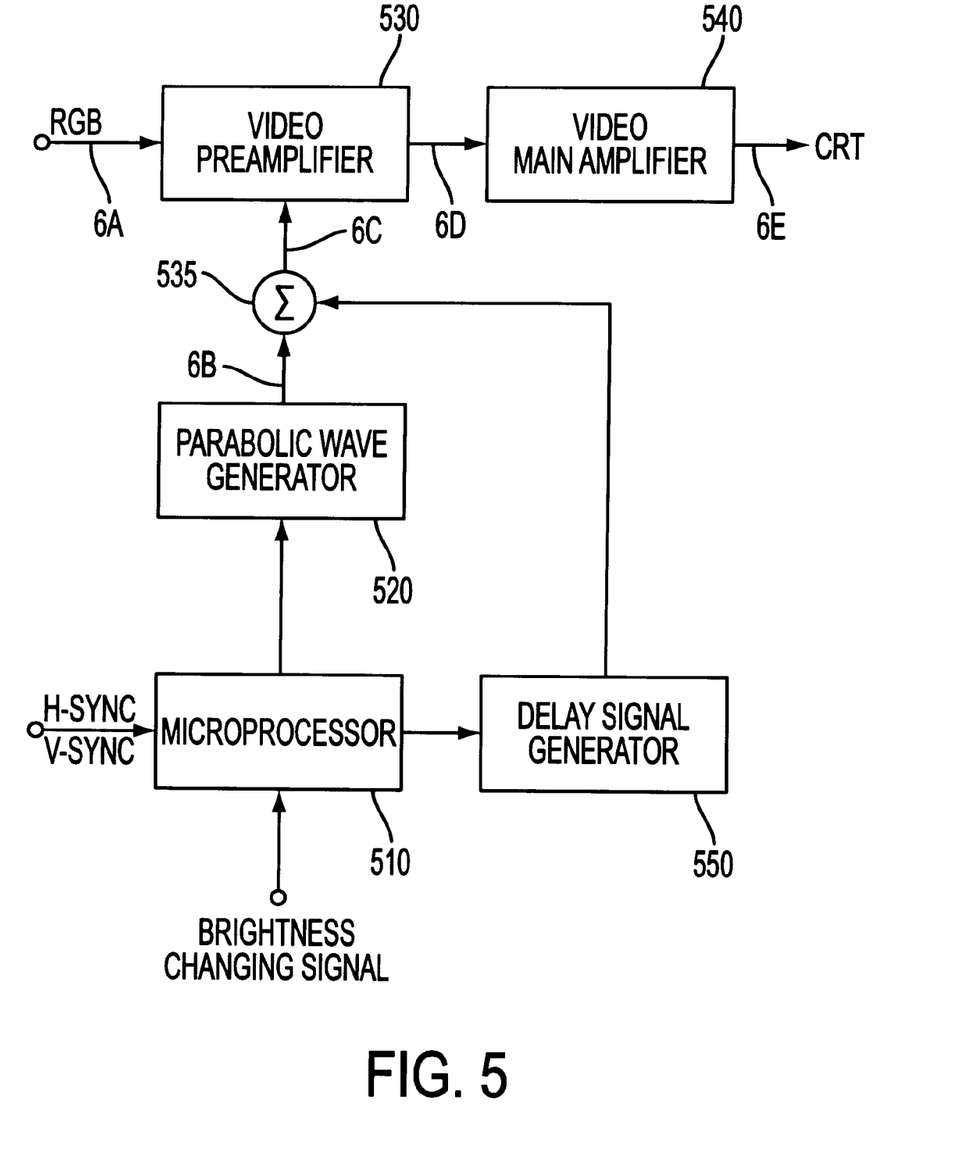
FIG. 5 is a block diagram of a brightness control device according to a third embodiment of the present invention.

FIG. 5 is a block diagram showing a brightness control device according to a third embodiment of the present invention. Referring to FIG. 5, a microprocessor 510 receives a synchronization signal (both the H-SYNC and V-SYNC signals) from a display signal source (not shown) and a brightness changing signal from a control panel (not shown). The microprocessor 510 recognizes the frequency of the input synchronization signal and outputs a brightness control signal according to the recognized frequency and the brightness changing signal. The brightness control signal output from the microprocessor 510 is applied to a parabolic wave generator 520 and a delay signal generator 350. The parabolic wave generator 520 generates a parabolic wave according to the brightness control signal supplied from the microprocessor 510. The delay signal generator 550 generates a delay signal according to the brightness control signal supplied from the microprocessor 510. A video signal (RGB signal) generated from the display signal source is supplied to a video preamplifier 530. The parabolic wave and the delay signal are transmitted to a summer 535, which outputs a third summed signal. The video signal and the third summed signal are summed in a contrast controller (not shown) established in the video preamplifier 530, to generate a fourth summed signal. The video preamplifier 530 amplifies the third summed signal and outputs the amplified signal (fourth summed signal) to a video main amplifier 540. The amplified video signal transferred from the video preamplifier 530 is inverted and amplified by the video main amplifier 540.

Figure 6A:
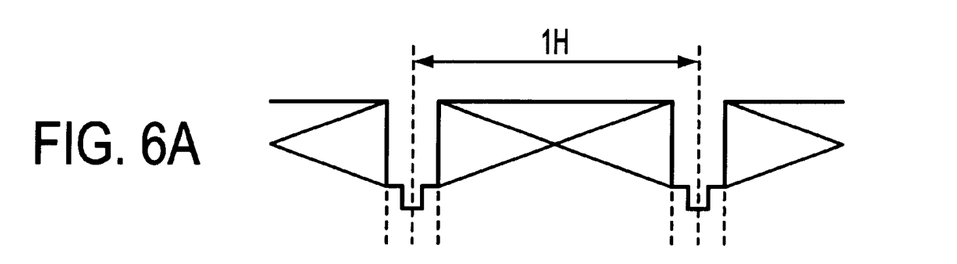
FIGS. 6A–6E show waveforms of various signals present at respective points of the brightness control device shown in FIG. 5.
Figure 6B:
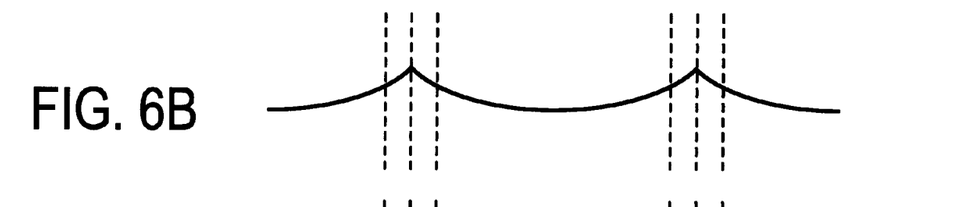
Figure 6C:
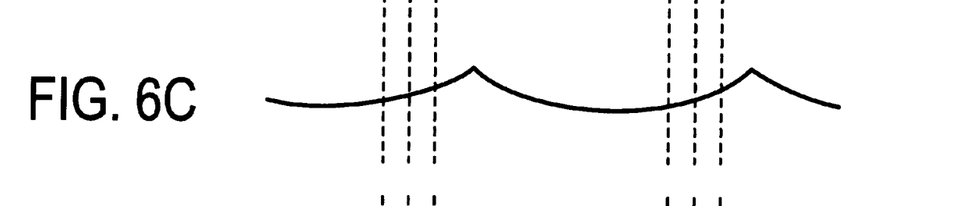
Figure 6D:
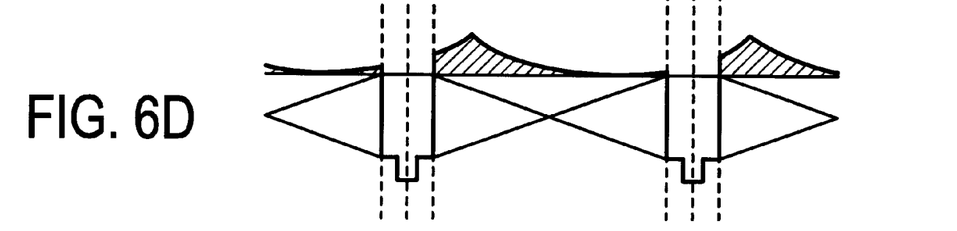
Figure 6E:
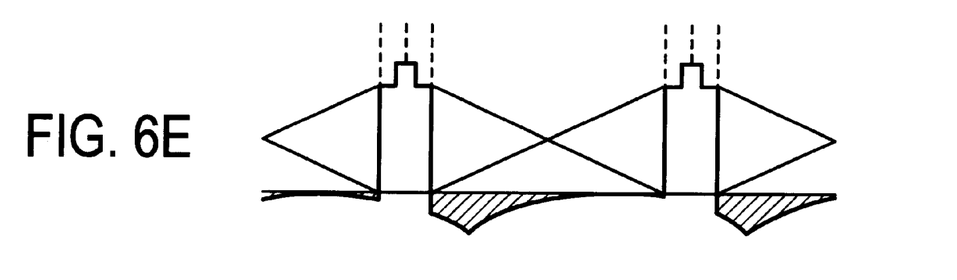

FIGS. 6A–6E show waveforms of various signals present at respective points of the brightness control circuit shown in FIG. 5. FIG. 6A shows the video signal supplied from the display signal source to the video preamplifier 530. FIG. 6B shows the parabolic wave generated by the parabolic wave generator 520. FIG. 6C shows the delayed parabolic wave (third summed signal). FIG. 6D shows the video signal (fourth summed signal) output from the video preamplifier 530 after summing the video signal and the delayed parabolic wave (third summed signal). FIG. 6E shows the video signal amplified and inverted by the video main amplifier 540.

Figure 7:
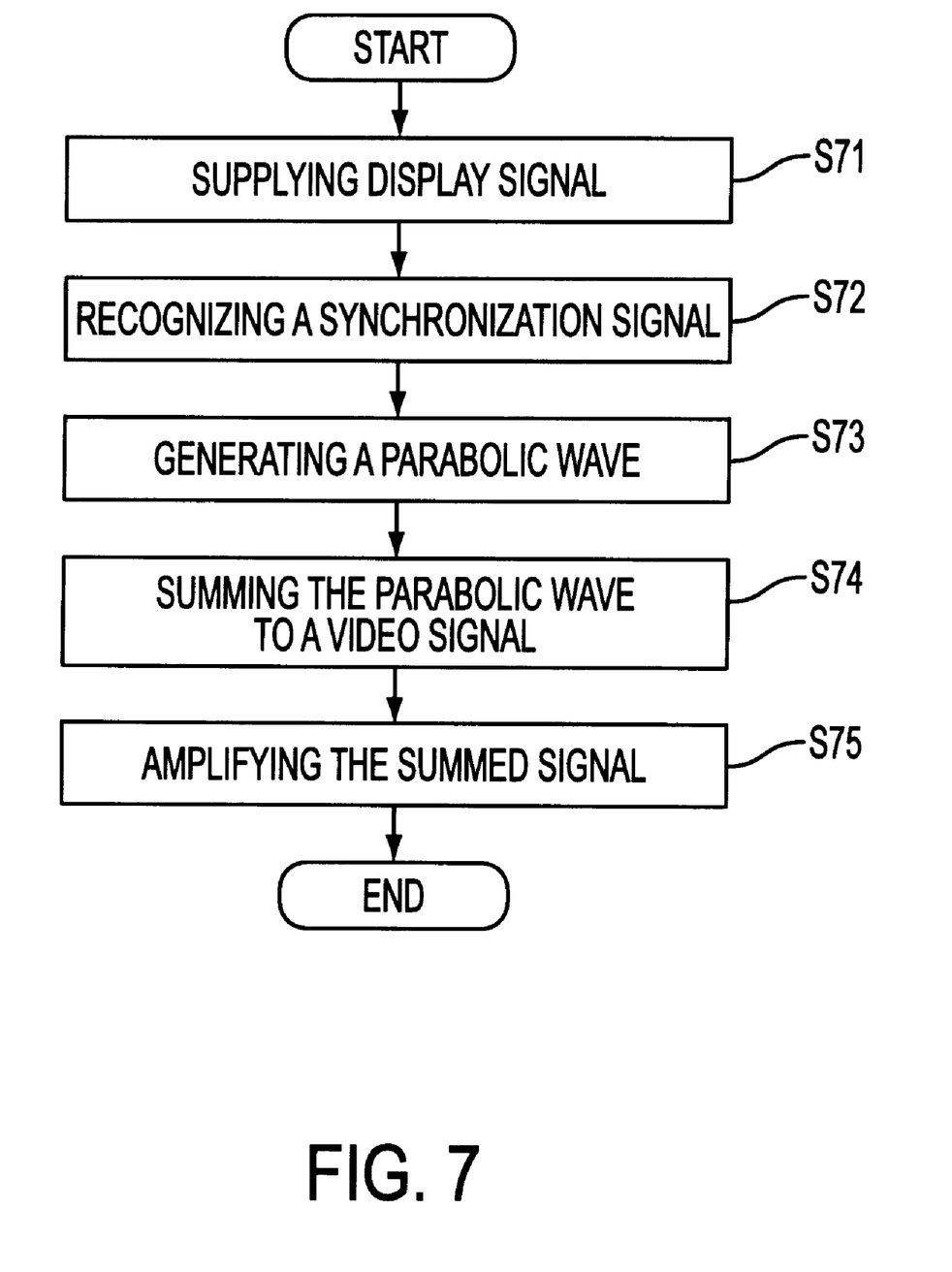
FIG. 7 is a flowchart showing a first method of controlling the brightness in accordance with the first embodiment of the present invention.

FIG. 7 is a flowchart showing a first method of controlling the brightness in accordance with the first embodiment of the present invention using the brightness control circuit shown in FIG. 1. FIG. 7 shows the operation of automatic controlling of the brightness according to the recognized frequency of the input synchronization signal. In step S71, the display signal generated by the display signal source is transmitted to the display device. The synchronization signal is transmitted to the microprocessor 110 and the video signal is transmitted to the video preamplifier 130. In step S72, the microprocessor 110 recognizes the frequency of the input synchronization signal and outputs the brightness control signal according to the recognized frequency. In step S73, the parabolic wave generator 120 generates the parabolic wave according to the brightness control signal supplied from the microprocessor 110. In step S74, the parabolic wave and the video signal are summed in the video preamplifier 130. In step S75, the video preamplifier amplifies the summed video signal and outputs the amplified signal to the video main amplifier 140.

Figure 8:
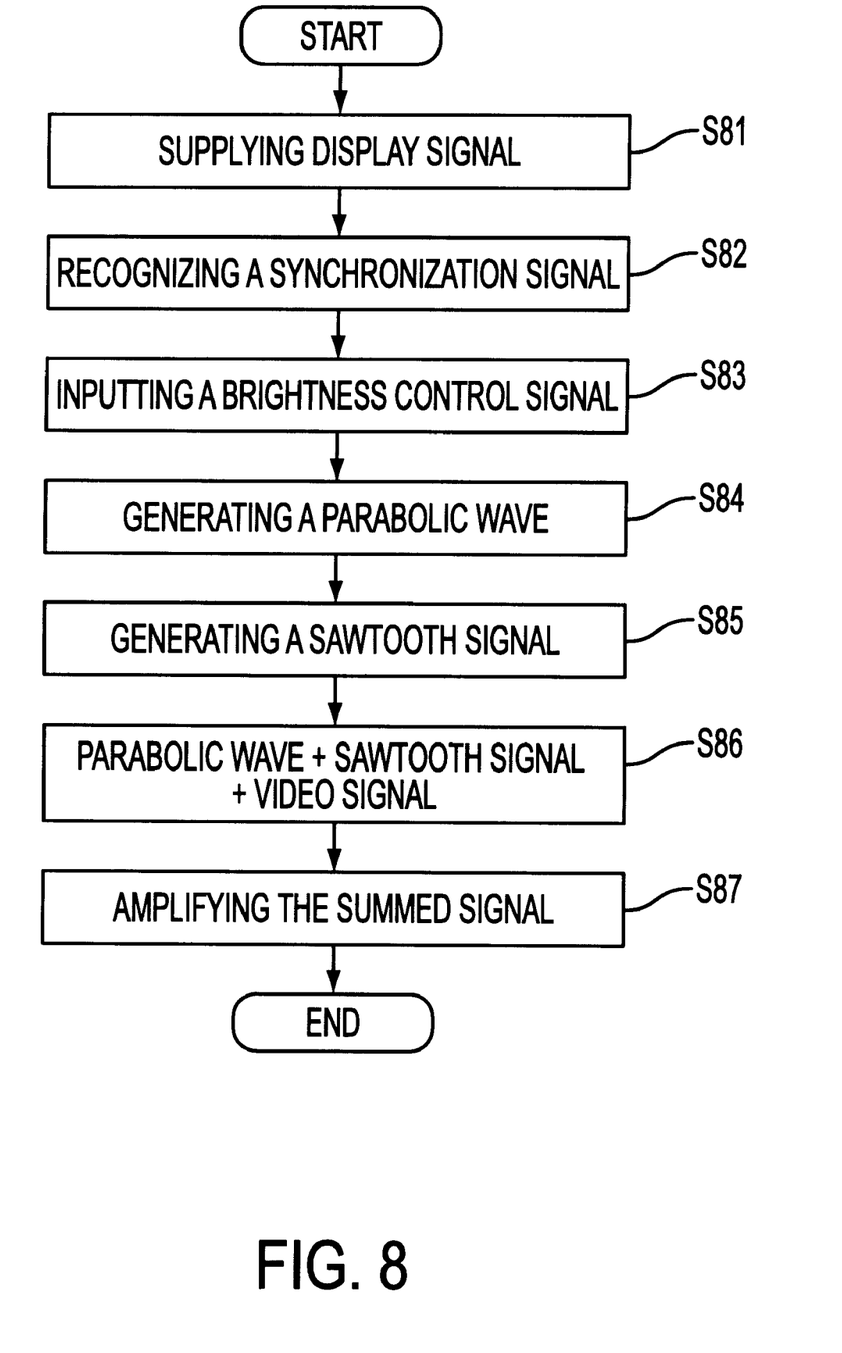
FIG. 8 is a flowchart of showing a second method of controlling the brightness in accordance with the second embodiment of the present invention.

FIG. 8 is a flowchart showing a second method of controlling the brightness in accordance with the second embodiment of the present invention using the brightness control circuit shown in FIG. 3. FIG. 8 shows the operation of controlling of the brightness according to a brightness changing signal input by a user through a control panel. In step S81, the display signal generated by the display signal source is transmitted to the display device. The synchronization signal is transmitted to the microprocessor 310 and the video signal is transmitted to the video preamplifier 330. In step S82, the microprocessor 310 recognizes the frequency of the input synchronization signal. In step S83, the user inputs the brightness changing signal through the control panel or keyboard. The brightness changing signal is supplied to the microprocessor 310. The microprocessor 310 outputs the brightness control signal according to the recognized frequency and the brightness changing signal from the control panel. In step S84, the parabolic wave generator 320 generates the parabolic wave according to the brightness control signal supplied from the microprocessor 310. In step S85, the sawtooth signal generator 350 generates the sawtooth signal according to the brightness control signal supplied from the microprocessor 310. In step S86, the parabolic wave and the sawtooth signal are summed in the summer 335 to generate the first summed signal and the first summed signal and the video signal are summed in the video preamplifier 330 to generate the second summed signal. In step S87, the video preamplifier 330 amplifies the second summed video signal and outputs the amplified signal to the video main amplifier 340.

Figure 9:
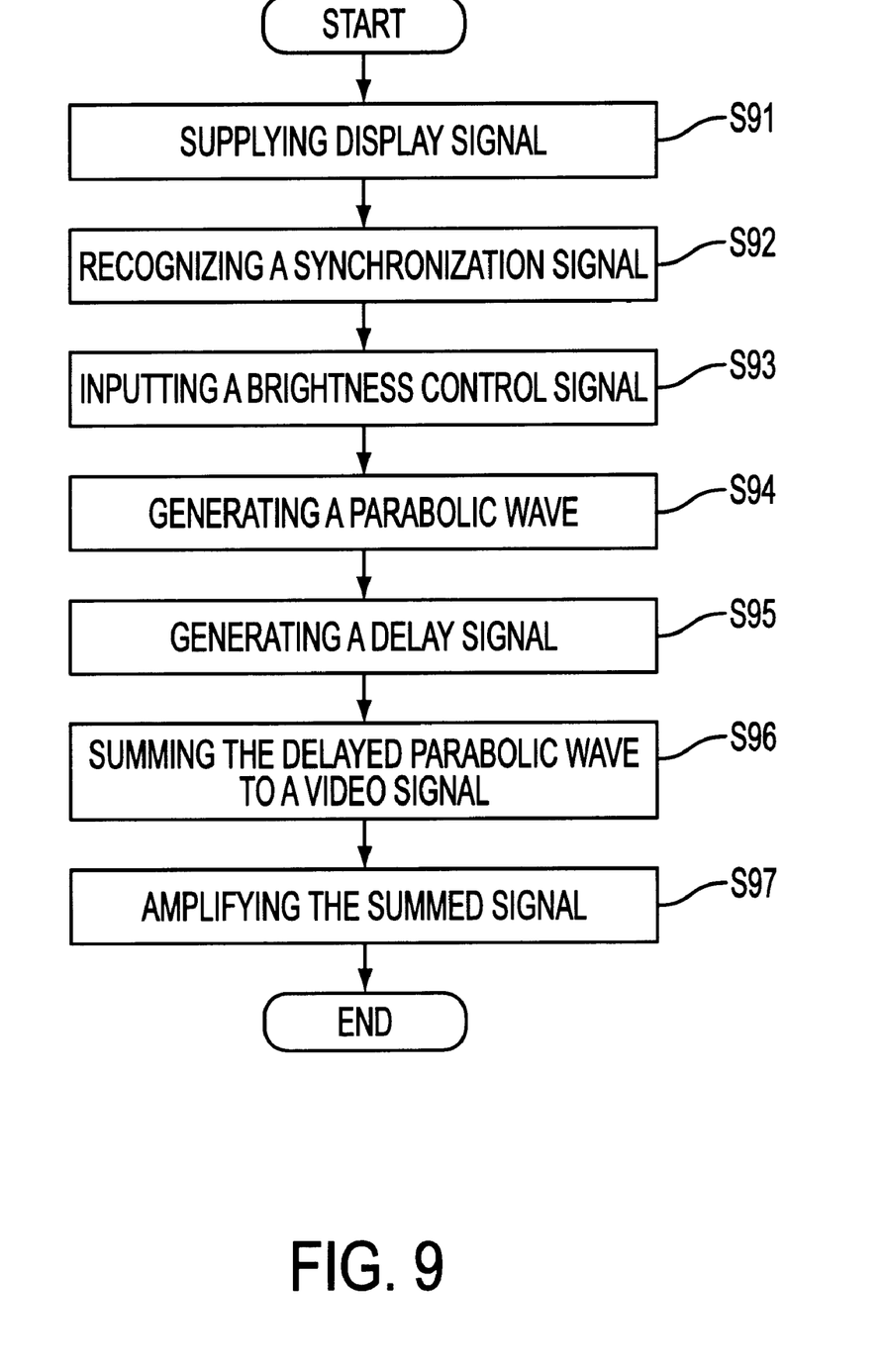
FIG. 9 is a flowchart of showing a third method of controlling the brightness in accordance with the third embodiment of the present invention.

FIG. 9 is a flowchart showing a third method of controlling the brightness in accordance with the third embodiment of the present invention using the brightness control circuit shown in FIG. 5. FIG. 9 shows the operation of controlling of the brightness according to a brightness changing signal input by the user through the control panel. In step S91, the display signal generated by the display signal source is transmitted to the display device. The synchronization signal is transmitted to the microprocessor 510 and the video signal is transmitted to the video preamplifier 530. In step S92, the microprocessor 510 recognizes the frequency of the input synchronization signal. In step S93, the user inputs the brightness changing signal through the control panel or keyboard. The brightness changing signal is supplied to the microprocessor 510. The microprocessor outputs the brightness control signal according to the recognized frequency and the brightness changing signal from the control panel. In step S94, the parabolic wave generator 520 generates the parabolic wave according to the brightness control signal supplied from the microprocessor. In step S95, the delay signal generator 550 generates the delay signal according to the brightness control signal supplied from the microprocessor 510. In step S96, the parabolic wave is delayed by the delay signal supplied from the delay signal generator through the summer 535. The delayed parabolic wave and video signal are summed in the video preamplifier 530. In step S97, the video preamplifier 530 amplifies the summed video signal and outputs the amplified signal to the video main amplifier 540.

In accordance with the above, a microprocessor receives both an H-SYNC signal and a V-SYNC signal. If a user wants to change the brightness of a left corner of the display device (CRT), the microprocessor outputs a brightness control signal to generate a sawtooth signal/delay signal and a parabolic wave to increase the voltage of the left corner based on the H-SYNC. If the user wants to change the brightness of the bottom of the display device (CRT), the microprocessor outputs the brightness control signal to generate the sawtooth/delay signal and parabolic wave to increase the voltage of the bottom of the monitor base on the V-SYNC.

It will be apparent to those skilled in the art that various modifications can be made in the a brightness control device and a method thereof of the present invention, without departing from the spirit of the invention. Thus, it is intended that the present invention cover such modifications as well as variations thereof, within the scope of the appended claims and their equivalents.

What is claimed is:

1. A brightness adjustment device for a display device and which receives a synchronizing signal and a video signal, comprising:

a microprocessor to output a brightness control signal according to the synchronizing signal;

a parabolic wave generator to generate a parabolic wave according to the brightness control signal supplied from said microprocessor;

a video preamplifier to sum the video signal and the parabolic wave supplied from said parabolic generator to generate a summed signal, and to amplify the summed signal to generate a first amplified video signal; and a video main amplifier to amplify the first amplified video signal supplied from said video preamplifier, to output a second amplified video signal.

2. The brightness adjustment device as claimed in claim 1, wherein said video preamplifier comprises a contrast controller to which the parabolic wave generated by said parabolic wave generator is applied.

3. A brightness adjustment device for a display device and which receives a synchronizing signal and a video signal, comprising:

a microprocessor to output a brightness control signal according to the synchronizing signal;

a parabolic wave generator to generate a parabolic wave according to the brightness control signal supplied from said microprocessor;

a sawtooth wave generator to generate a sawtooth wave according to the brightness control signal supplied from said microprocessor;

a preamplification unit to sum the video signal, the parabolic wave supplied from said parabolic generator and the sawtooth wave provided from said sawtooth wave generator to generate a summed signal, and to amplify the summed signal to generate a first amplified video signal; and a video main amplifier to amplify the first amplified video signal supplied from said preamplification unit to generate a second amplified video signal, and to output the second amplified video signal.

4. The brightness adjustment device as claimed in claim 3, wherein said preamplification unit comprises a contrast controller to which the parabolic wave is applied.

5. The brightness adjustment device as claimed in claim 3, wherein said preamplification unit comprises:
- a summer to sum the parabolic wave and the sawtooth wave, to generate a first summed signal; and
- a video preamplifier to sum the video signal and the first summed signal, to generate a second summed signal, and to amplify the second summed signal to generate the first amplified video signal.

6. A brightness adjustment device for a display device and which receives a synchronizing signal and a video signal, comprising:
- a microprocessor to output a brightness control signal according to the synchronizing signal;
- a parabolic wave generator to generate a parabolic wave according to the brightness control signal supplied from said microprocessor;
- a delay signal generator to generate a delay signal according to the brightness control signal supplied from said microprocessor;
- a preamplification unit to sum the video signal, the parabolic wave supplied from said parabolic generator and the delay signal generated by said delay signal generator to generate a summed signal, and to amplify the summed signal to generate a first amplified video signal; and
- a video main amplifier to amplify the first amplified video signal supplied from said preamplification unit to generate a second amplified video signal, and to output the second amplified video signal.

7. The brightness adjustment device as defined in claim 6, wherein said preamplification unit comprises a contrast controller to which the parabolic wave is applied.

8. The brightness adjustment device as claimed in claim 5, wherein said preamplification unit comprises:
- a summer to sum the parabolic wave and the delay signal, to generate a first summed signal; and
- a video preamplifier to sum the video signal and the first summed signal, to generate a second summed signal, and to amplify the second summed signal to generate the first amplified video signal.

9. The brightness adjustment device as claimed in claim 5, wherein said preamplification unit comprises:
- a delay to delay the parabolic wave in accordance with the delay signal, to generate a delayed parabolic wave; and
- a video preamplifier to sum the video signal and the delayed parabolic wave, to generate the summed signal, and to amplify the summed signal to generate the first amplified video signal.

10. A method of brightness adjustment for a display device which receives a synchronizing signal and a video signal, comprising the steps of:
- recognizing a frequency of the received synchronizing signal;
- generating a brightness control signal according to the recognized frequency;
- generating a parabolic wave according to the brightness control signal;
- summing the parabolic wave and the video signal, to generate a summed signal;
- amplifying the summed signal, to generate an amplified signal; and
- outputting the amplified signal.

11. A method of brightness adjustment for a display device which receives a synchronizing signal and a video signal, comprising the steps of:
- recognizing a frequency of the received synchronizing signal;
- inputting a brightness changing signal;
- generating a brightness control signal according to the recognized frequency and the brightness changing signal;
- generating a parabolic wave according to the brightness control signal;
- generating a sawtooth signal according to the brightness control signal;
- summing the parabolic wave the sawtooth signal and the video signal, to generate a summed signal;
- amplifying the summed signal, to generate an amplified signal; and
- outputting the amplified signal.

12. The method of brightness adjustment as claimed in claim 11, wherein said step of summing the parabolic wave, the sawtooth signal and the video signal comprises the steps of:
- summing the parabolic wave and the sawtooth signal, to generate a first summed signal; and
- summing the first summed signal and the video signal, to generate the summed signal.

13. A method of brightness adjustment for a display device which receives a synchronizing signal and a video signal, comprising the steps of:
- recognizing a frequency of the received synchronizing signal;
- inputting a brightness changing signal;
- generating a brightness control signal according to the discriminated frequency and the brightness changing signal;
- generating a parabolic wave according to the brightness control signal;
- generating a delay signal according to the brightness control signal;
- summing the parabolic wave, the delay signal and the video signal, to generate a summed signal;
- amplifying the summed signal, to generate an amplified signal; and
- outputting the amplified signal.

14. The method of brightness adjustment as claimed in claim 13, wherein said step of summing the parabolic wave, the delay signal and the video signal comprises the steps of:
- summing the parabolic wave and the delay signal, to generate a first summed signal; and
- summing the first summed signal and the video signal, to generate the summed signal.

15. The method of brightness adjustment as claimed in claim 13, wherein said step of summing the parabolic wave, the sawtooth signal and the video signal comprises the steps of:
- delaying the parabolic wave in accordance with the delay signal, to generate a delayed parabolic wave; and
- summing the delayed parabolic wave and the video signal, to generate the summed signal.

16. A brightness adjustment device for a display device and which receives a synchronizing signal and a video signal, comprising:

a processing unit to output a brightness control signal according to the synchronizing signal;

a parabolic wave generator to generate a parabolic wave according to the brightness control signal;

an amplification unit to sum and amplify the parabolic wave and the video signal, to generate an amplified video signal.

17. The brightness adjustment device as claimed in claim 16, wherein said processing unit discriminates a frequency of the synchronizing signal, and outputs the brightness control signal in accordance with the frequency.

18. The brightness adjustment device as claimed in claim 16, wherein said amplification unit sums the parabolic wave and the video signal to generate a summed signal and amplifies the summed signal.

19. The brightness adjustment device as claimed in claim 16, wherein said amplification unit comprises:

a video preamplifier to sum the parabolic wave and the video signal to generate a the summed signal and amplifies the summed signal, to generate an intermediate amplified video signal; and a video main amplifier to amplify the intermediate amplified video signal to generate the amplified video signal.

20. The brightness adjustment device as claimed in claim 16, further comprising a sawtooth signal generator to generate a sawtooth signal, wherein said amplification unit sums and amplifies the sawtooth signal with the parabolic wave and the video signal, to generate the amplified video signal.

21. The brightness adjustment device as claimed in claim 19, further comprising:

a sawtooth signal generator to generate a sawtooth signal; and a summer to sum the parabolic wave and the sawtooth signal, to generate a first summed signal;

wherein said video preamplifier sums the first summed signal and the video signal, to generate the summed signal.

22. The brightness adjustment device as claimed in claim 16, further comprising a delay signal generator to generate a delay signal, wherein said amplification unit sums and amplifies the delay signal with the parabolic wave and the video signal, to generate the amplified video signal.

23. The brightness adjustment device as claimed in claim 19, further comprising a delay to delay the parabolic wave, wherein said video preamplifier sums the delayed parabolic wave and the video signal, to generate the summed signal.

24. The brightness adjustment device as claimed in claim 21, wherein said delay comprises:

a delay signal generator to generate a delay signal; and a summer to sum the delay signal and the parabolic wave, to generate first summed signal, wherein said video preamplifier sums the first summed signal and the video signal to generate the summed signal.

25. A method of brightness adjustment for a display device which receives a synchronizing signal and video signal, comprising the steps of:

generating a brightness control signal according to the synchronizing signal;

generating a parabolic wave according to the brightness control signal; and generating an adjusted video signal by adjusting the video signal according to the parabolic wave.

26. A display device which receives a synchronizing signal and a video signal to display images, comprising:

a display to display the images according to an amplified video signal;

a processing unit to output a brightness control signal according to the synchronizing signal;

a wave generator to generate a waveform according to the brightness control signal;

an amplification unit to sum and amplify the waveform and the video signal, to generate the amplified video signal, wherein the waveform adjusts a voltage for the video signal at corners of the display.

27. The display device as claimed in claim 26, wherein the display is a cathode ray tube and the waveform is a parabolic wave.

28. The display device as claimed in claim 27, further comprising another waveform generator to generate a sawtooth signal or a delay signal, wherein said amplification unit sums and amplifies the sawtooth signal or the delay signal with the waveform and the video signal, to generate the amplified video signal.

* * * * *